(12) United States Patent
Chen et al.

(10) Patent No.: US 8,188,703 B2
(45) Date of Patent: May 29, 2012

(54) ENERGY HARVESTING SYSTEM

(75) Inventors: Chien-Ying Chen, Taipei (TW);
Pai-Hsiang Chou, Hsinchu (TW)

(73) Assignee: National Tsing Hua University,
Hsinchu (TW)

( * ) Notice: Subject to any disclaimer, the term of this patent is extended or adjusted under 35 U.S.C. 154(b) by 239 days.

(21) Appl. No.: 12/794,217

(22) Filed: Jun. 4, 2010

(65) Prior Publication Data
US 2011/0172847 A1 Jul. 14, 2011

(30) Foreign Application Priority Data
Jan. 14, 2010 (TW) .............................. 99100899 A

(51) Int. Cl.
*H01M 10/44* (2006.01)
*H02J 7/04* (2006.01)

(52) U.S. Cl. ......... 320/101; 320/139; 320/141; 320/162

(58) Field of Classification Search ................... 320/101
See application file for complete search history.

(56) References Cited

U.S. PATENT DOCUMENTS

| 2008/0036440 A1* | 2/2008 | Garmer | 323/299 |
| 2009/0140715 A1* | 6/2009 | Adest et al. | 323/318 |
| 2011/0132424 A1* | 6/2011 | Rakib | 136/244 |

* cited by examiner

*Primary Examiner* — Edward Tso
*Assistant Examiner* — Johali Torres Ruiz
(74) *Attorney, Agent, or Firm* — Ohlandt, Greeley, Ruggiero & Perle, LLP

(57) ABSTRACT

An energy harvesting system includes: an energy harvesting unit for converting energy from a natural energy source into an electrical power signal; a power point tracking unit including a current tracing module capable of detecting a current of the electrical power signal, and a boundary control module; a microcontroller including a voltage detecting module capable of detecting a voltage of the electrical power signal, and a computing module for determining a maximum power point with reference to the voltage and the current of the electrical power signal, the boundary control module generating a switch control voltage signal with reference to the maximum power point; a storage unit capable of storing energy; and a pulse frequency modulation regulator for converting the electrical power signal into an intermediate signal with reference to the switch control voltage signal for subsequent storage of energy of the intermediate signal in the storage unit.

18 Claims, 8 Drawing Sheets

ENERGY HARVESTING SYSTEM

CROSS-REFERENCE TO RELATED APPLICATION

This application claims priority of Taiwanese Application No. 099100899, filed on Jan. 14, 2010.

BACKGROUND OF THE INVENTION

1. Field of the Invention

The invention relates to an energy harvesting system, more particularly to a solar-powered energy harvesting system.

2. Description of the Related Art

Fossil fuel, gasoline and natural gas are among the most commonly used energy sources. However, they are sources of environmental hazards that pose threats to the environment. With the decrease of the available amount of these energy sources and with the increase of environmental consciousness, non-polluting and viable energy, such as solar energy, is developing into a major alternative energy source.

A conventional solar-powered energy harvesting system includes at least one solar panel and a control circuit. In order to achieve the greatest harvesting efficiency possible, separate measuring equipment is required to obtain a set of parameters in current and voltage corresponding to the energy generated by the solar panel under different loading conditions. The set of parameters are loaded into the control circuit via firmware, and are used for locating a maximum power point for optimal operation of the solar panel.

However, the conventional solar-powered energy harvesting system has the following limitations:

1. Additional measuring equipment is required for generating the set of parameters, creating additional costs.

2. Once the set of parameters are loaded into the control circuit, they cannot be changed. However, characteristics of the solar panel may vary according to weather conditions and ambient temperature. Therefore, it is likely that the solar panel does not actually operate at the maximum power point.

3. The set of parameters loaded into the control circuit corresponds to the specific solar panel from which it is measured, such that the control circuit is designed for controlling that specific solar panel only. Therefore, the conventional solar-powered energy harvesting system is not flexible in that once the solar panel is replaced, the control circuit needs to be updated with a new set of parameters that correspond to the replacement solar panel, resulting in extra costs.

SUMMARY OF THE INVENTION

Therefore, the object of the present invention is to provide an energy harvesting system that can eliminate the aforesaid drawbacks of the prior art.

According to the present invention, there is provided an energy harvesting system that includes an energy harvesting unit, a power point tracking unit, a microcontroller, a storage unit, and a pulse frequency modulation regulator. The energy harvesting unit is adapted for converting energy from a natural energy source into an electrical power signal. The power point tracking unit includes a current tracing module that is coupled to the energy harvesting unit and that is capable of detecting a current of the electrical power signal, and a boundary control module. The microcontroller includes a voltage detecting module that is coupled to the energy harvesting unit and that is capable of detecting a voltage of the electrical power signal, and a computing module that is coupled to the voltage detecting module and the current tracing module of the power point tracking unit, and that determines a maximum power point with reference to the voltage and the current of the electrical power signal as respectively detected by the voltage detecting module and the current tracing module. The boundary control module of the power point tracking unit receives the maximum power point that is determined by the computing module, and generates a switch control voltage signal with reference to the maximum power point. The storage unit is capable of storing energy. The pulse frequency modulation regulator is coupled to the energy harvesting unit and the power point tracking unit for respectively receiving the electrical power signal and the switch control voltage signal therefrom, and converts the electrical power signal into an intermediate signal with reference to the switch control voltage signal for subsequent storage of energy of the intermediate signal in the storage unit.

Preferably, the energy harvesting system further includes a voltage regulating unit that is coupled to the storage unit for converting the energy released by the storage unit into an output signal.

The effects and advantages of the present invention lie in that harvesting efficiency of the energy harvesting unit is increased, that the time it takes for energy storage is shortened, and that the maximum power point can be updated such that optimal operation of the energy harvesting system is ensured regardless of weather conditions and ambient temperature.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
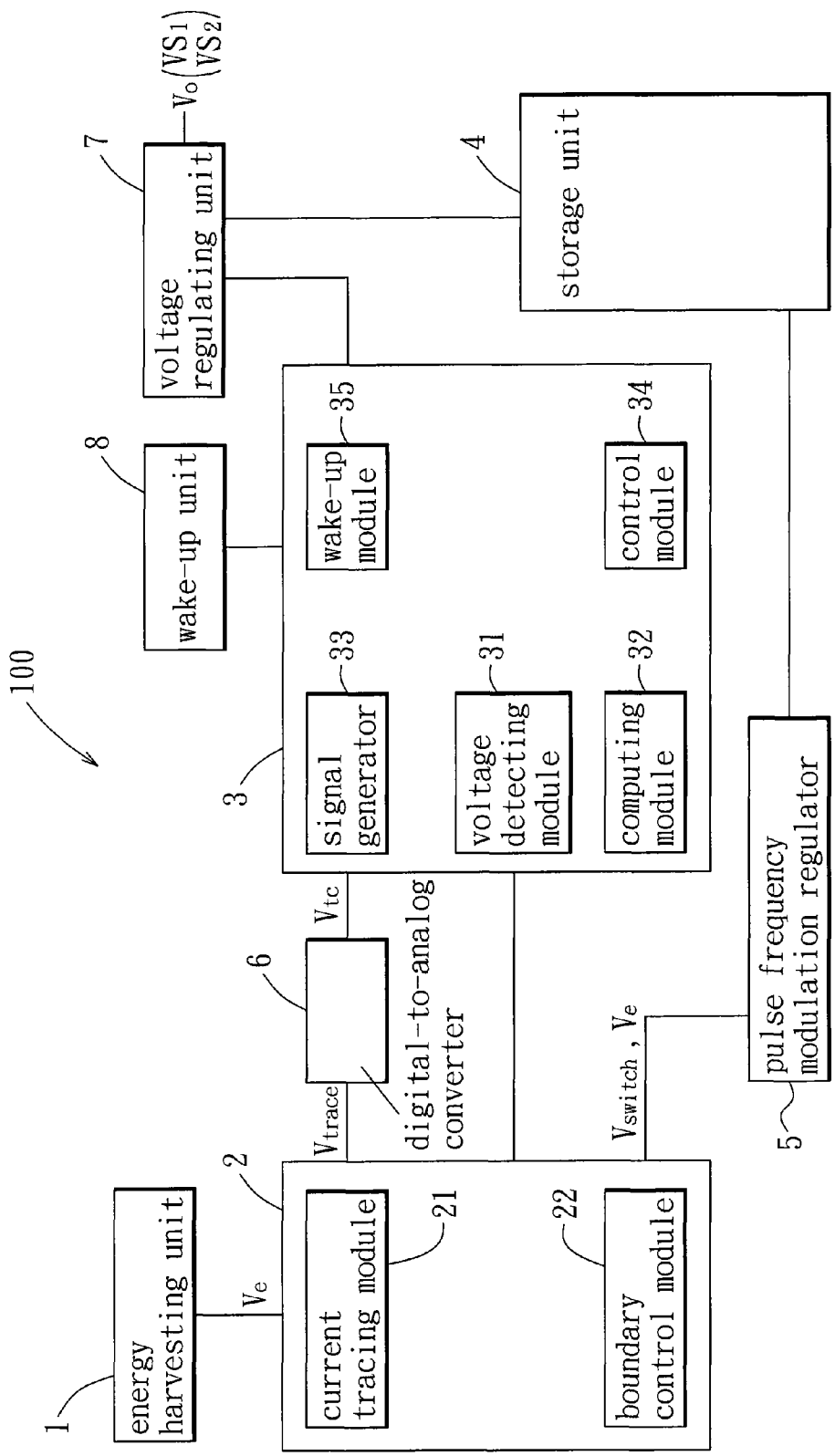
FIG. 1 is a schematic block diagram of the preferred embodiment of an energy harvesting system according to the present invention.

With reference to FIG. 1, the preferred embodiment of an energy harvesting system 100 according to the present invention includes an energy harvesting unit 1, a power point tracking unit 2, a microcontroller 3, a storage unit 4, and a pulse frequency modulation (PFM) regulator 5.

The energy harvesting unit 1 is adapted for converting energy from a natural energy source into an electrical power signal ($V_e$). While the energy harvesting system 100 is exemplified as a solar-powered energy harvesting system in this embodiment, the present invention is not limited thereto. Accordingly, in this embodiment, the energy harvesting unit 1 includes at least one solar panel that is capable of converting light energy into the electrical power signal ($V_e$).

The power point tracking unit 2 includes a current tracing module 21 that is coupled to the energy harvesting unit 1 and that is capable of detecting a current of the electrical power signal ($V_e$) under each of various loading conditions, and a boundary control module 22.

The microcontroller 3 includes a voltage detecting module 31 that is coupled to the energy harvesting unit 1 and that is capable of detecting a voltage of the electrical power signal ($V_e$) under each of various loading conditions, and a computing module 32 that is coupled to the voltage detecting module 31 and the current tracing module 21 of the power point tracking unit 2, and that determines a maximum power point corresponding to the energy harvesting unit 1 with reference to the voltages and the currents of the electrical power signal ($V_e$) as respectively detected by the voltage detecting module 31 and the current tracing module 21 under the various loading conditions. The boundary control module 22 of the power point tracking unit 2 receives the maximum power point determined by the computing module 32, and generates a switch control voltage signal ($V_{switch}$) with reference to the maximum power point. In this embodiment, the voltage detecting module 31 is an analog-to-digital converter (ADC).

The storage unit 4 is capable of storing energy.

The pulse frequency modulation regulator 5 is coupled to the energy harvesting unit 1 and the power point tracking unit 2 for respectively receiving the electrical power signal ($V_e$) and the switch control voltage signal ($V_{switch}$) therefrom, and converts the electrical power signal ($V_e$) into an intermediate signal with reference to the switch control voltage signal ($V_{switch}$) for subsequent storage of energy of the intermediate signal in the storage unit 4.

In this embodiment, the energy harvesting system 100 operates in two separate modes, namely a tracing mode and a storing mode. When the energy harvesting system 100 operates in the tracing mode, the computing module 32 of the microcontroller 3 determines the maximum power point with reference to the voltage and the current of the electrical power signal ($V_e$) as respectively detected by the voltage detecting module 31 and the current tracing module 21. After the maximum power point is determined, the energy harvesting system 100 enters the storing mode, where the electrical power signal ($V_e$) is converted into the intermediate signal at the maximum power point corresponding to the energy harvesting unit 1 for subsequent storage of energy of the intermediate signal in the storage unit 4 to thereby enhance the energy harvesting efficiency of the energy harvesting unit 1 and decrease the time it takes for storage of energy in the storage unit 4.

In the following description, details will be provided as to the various components of the energy harvesting system 100 of the preferred embodiment and the operations of these components under the tracing mode and the storing mode.

Figure 2:
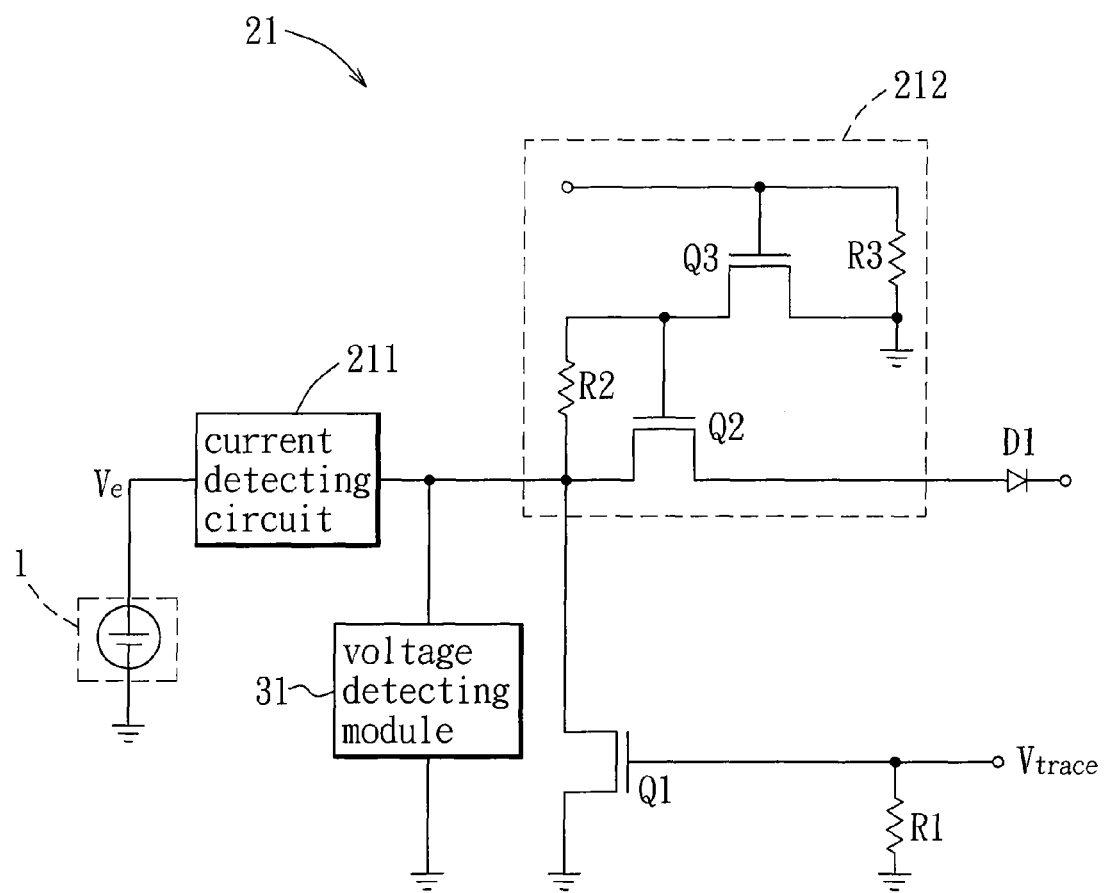
FIG. 2 is a schematic circuit diagram of a current racing module of a power point tracking unit according to the preferred embodiment.

In this embodiment, the microcontroller 3 further includes a control module 34 for controlling the current tracing module 21 of the power point tracking unit 2 to detect the current of the electrical power signal ($V_e$). With reference to FIG. 2, the current tracing module 21 includes a current detecting circuit 211 and a first switch member (Q1).

The current detecting circuit 211 has an input terminal and an output terminal. The input terminal is coupled to the energy harvesting unit 1 for receiving the electrical power signal ($V_e$) therefrom. The first switch member (Q1) has a first terminal that is coupled to the output terminal of the current detecting circuit 211, and a grounded second terminal. The first switch member (Q1) is an impedance-variable switch member that is operable between on and off states, and that is controllable to have at least two different equivalent impedances when operating in the on state. The voltage detecting module 31 of the microcontroller 3 is connected to the first switch member (Q1).

When the first switch member (Q1) operates in the on state, the current detecting circuit 211 is capable of detecting a current flowing through the first switch member (Q1) and corresponding to the at least two equivalent impedances, and the voltage detecting module 31 of the microcontroller 3 is capable of detecting a voltage across the first switch member (Q1) and corresponding to the at least two equivalent impedances. The computing module 32 determines the maximum power point with reference to the voltages and the currents detected respectively by the voltage detecting module 31 and the current tracing module 21 and corresponding respectively to the at least two different equivalent impedances of the first switch member (Q1).

In this embodiment, the first switch member (Q1) further has a control terminal that receives a trace signal ($V_{trace}$), which controls operation of the first switch member (Q1) in the on and off states, and which also controls the equivalent impedance of the first switch member (Q1). The current tracing module 21 further includes a first resistor (R1) that is coupled between the control terminal of the first switch member (Q1) and ground.

Moreover, the current tracing module 21 further includes a first switch circuit 212. The first switch circuit 212 is operable to establish connections between the output terminal of the current detecting circuit 211 and the pulse frequency modulation regulator 5 and between the output terminal of the current detecting circuit 211 and the boundary control module 22 of the power point tracking unit 2 so as to permit transmission of the electrical power signal ($V_e$) to the pulse frequency modulation regulator 5 and the boundary control module 22. In short, the first switch circuit 212 operates in the on state when the connections among the current detecting circuit 211, the pulse frequency modulation regulator 5 and the boundary control module 22 are established, and operates in the off state when otherwise. The first switch member (Q1) operates in the on state when the first switch circuit 212 disconnects the current detecting circuit 211 from the boundary control module 22 and the pulse frequency modulation regulator 5. The boundary control module 22 of the power point tracking unit 2 generates the switch control voltage signal ($V_{switch}$) with reference to the maximum power point and the electrical power signal ($V_e$) when the first switch circuit 212 connects the current tracing module 21 thereto.

Preferably, the current tracing module 21 further includes a first diode (D1) coupling the first switch circuit 212 to the pulse frequency modulation regulator 5 and the boundary control module 22 for preventing adverse current from flowing from the pulse frequency modulation regulator 5 and the boundary control module 22 back into the energy harvesting unit 1 and causing possible damage to the energy harvesting unit 1.

When the energy harvesting system 100 operates in the tracing mode, the first switch circuit 212 disconnects the current detecting circuit 211 from the pulse frequency modulation regulator 5 and the boundary control module 22 (i.e., the first switch circuit 212 operates in the off state) such that the energy harvesting unit 1, the current detecting circuit 211 and the first switch member (Q1) form a closed loop. The current detecting circuit 211 detects the current flowing through the first switch member (Q1) and corresponding to the at least two equivalent impedances of the first switch member (Q1) (i.e., the current of the electrical power signal ($V_e$) corresponding to the at least two equivalent impedances), and transmits the same to the computing module 32 of the microcontroller 3. At the same time, the voltage detecting module 31 of the microcontroller 3 detects the voltage across the first switch member (Q1) and corresponding to the at least two equivalent impedances of the first switch member (Q1) (i.e., the voltage of the electrical power signal ($V_e$) corresponding to the at least two equivalent impedances), and transmits the same to the computing module 32 of the microcontroller 3.

In this embodiment, the trace signal ($V_{trace}$) transitions gradually from a low level to a high level such that the first switch member (Q1) switches from the off state gradually toward the on state, and the equivalent impedance of the first switch member (Q1) changes gradually from a high impedance level to a low impedance level. Since the equivalent impedance of the first switch member (Q1) is viewed as the load by the energy harvesting unit 1, the current and the voltage of the electrical power signal ($V_e$) vary as the equivalent impedance of the first switch member (Q1) varies, and are sampled respectively by the current tracing module 21 and the voltage detecting module 31.

Figure 3:
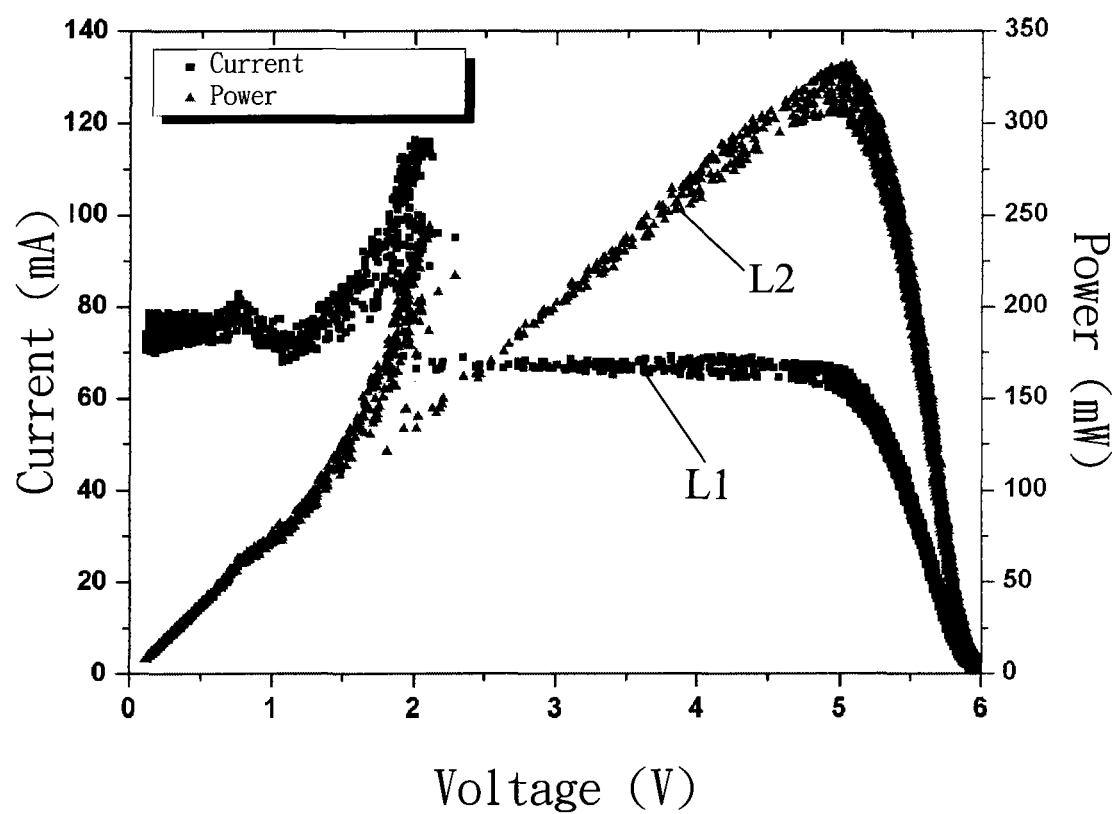
FIG. 3 is a wave diagram, illustrating an I-V curve and a power curve traced by a computing unit of a microcontroller according to the preferred embodiment.

As illustrated in FIG. 3, a current-voltage curve (i.e., I-V curve) can be traced using the detected currents and voltages. In FIG. 3, the X-axis represents the voltage of the electrical power signal ($V_e$), the left-Y-axis represents the current of the electrical power signal ($V_e$), and the I-V curve is indicated by curve (L1). The right-Y-axis represents a power of the electrical power signal ($V_e$), computed as the product of the current and voltage of the electrical power signal ($V_e$). A power curve is indicated by curve (L2), from which the maximum power point can be located, which corresponds to a voltage of 5V and a current of 68 mA.

After the maximum power point is located by the computing module 32, the energy harvesting system 100 enters the storing mode. In this mode, the first switch circuit 212 operates in the on state, and the first switch member (Q1) is controlled by the trace signal ($V_{trace}$) to operate in the off state, such that the electrical power signal ($V_e$) from the energy harvesting unit 1 is transmitted to the pulse frequency modulation regulator 5 and the boundary control module 22 of the power point tracking unit 2 via the current detecting circuit 211, the first switch circuit 212 and the first diode (D1).

In this embodiment, the microcontroller 3 further includes a signal generator 33, and the energy harvesting system 100 further includes a digital-to-analog converter (DAC) 6 that is coupled between the signal generator 33 and the current tracing module 21. In the tracing mode, the signal generator 33 generates a digital tracing control signal ($V_{tc}$), which is converted to the analog tracing signal ($V_{trace}$) by the digital-to-analog converter 6. The analog tracing signal ($V_{trace}$) is subsequently used for controlling the equivalent impedance of the first switch member (Q1). It should be noted herein that the tracing control signal ($V_{tc}$) may be different according to different settings, and the digital-to-analog converter 6 can be an independent component, or can be built within the microcontroller 3.

Since the voltage of the electrical power signal ($V_e$) is normally 15V or higher, it is preferable for the electrical power signal ($V_e$) to be regulated into 3.3V or 5V prior to storage into the storage unit 4 in order to optimize efficiency, and also in order to facilitate use of the regulated voltage as supply voltage for other components of the system. In this embodiment, the first switch circuit 212 is provided to permit transmission of the electrical power signal ($V_e$) to the pulse frequency modulation regulator 5 and the boundary control module 22. However, it should be noted herein that the energy harvesting unit 1 may also be connected directly to the pulse frequency modulation regulator 5 and the boundary control module 22 in other embodiments of the invention.

With reference to FIG. 2, the first switch circuit 212 includes a second switch member (Q2), a third switch member (Q3), a second resistor (R2), and a third resistor (R3).

The second switch member (Q2) has a first terminal that is coupled to the output terminal of the current detecting circuit 211, a second terminal that is coupled to the first diode (D1) for coupling to the pulse frequency modulation regulator 5 and the boundary control module 22 of the power point tracking unit 2, and a control terminal. The third switch member (Q3) has a first terminal that is coupled to the control terminal of the second switch member (Q2), a grounded second terminal, and a control terminal that is coupled to the control module 34 of the microcontroller 3 such that the third switch member (Q3) is turned on/off by control from the control module 34. The second resistor (R2) is connected between the first terminals of the second and third switch members (Q2, Q3). The third resistor (R3) is connected between the control terminal of the third switch member (Q3) and ground.

When the third switch member (Q3) is turned on, the control terminal of the second switch member (Q2) is grounded and is thus turned of, and the first switch circuit 312 operates in the off state. After the tracing signal ($V_{trace}$) has transitioned to the high level, the control module 34 controls the third switch member (Q3) to turn off, such that the second switch member (Q2) is turned on by the electrical power signal ($V_e$) to thereby switch the first switch circuit 312 to the on state.

Figure 4:
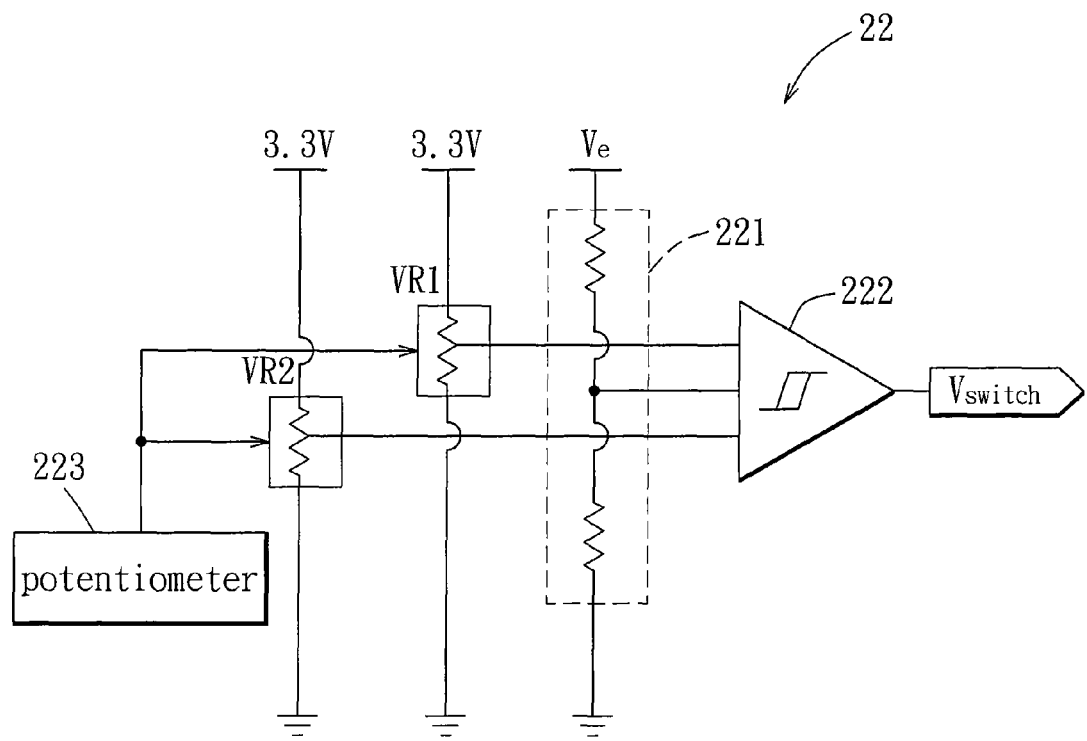
FIG. 4 is a schematic circuit diagram of a boundary control module of the power point tracking unit according to the preferred embodiment.

After the energy harvesting system 100 enters the storing mode, the boundary control module 22 of the power point tracking unit 2 receives the electrical power signal ($V_e$) from the energy harvesting unit 1. With reference to FIG. 4, the boundary control module 22 includes a voltage divider 221, a hysteresis buffer 222, a first variable resistor (VR1), a second variable resistor (VR2), and a potentiometer 223. The voltage divider 221 receives the electrical power signal ($V_e$) when the first switch circuit 212 establishes the connection between the output terminal of the current detecting circuit 211 and the boundary control module 22, and generates a divided voltage. The hysteresis buffer 222 is coupled to the voltage divider 221 for receiving the divided voltage therefrom, and generates the switch control voltage signal ($V_{Switch}$) with reference to the divided voltage according to a first threshold value and a second threshold value. The first and second threshold values cooperate to form a hysteresis interval of the hysteresis buffer 222. The first variable resistor (VR1) is coupled to the hysteresis buffer 222 for setting the first threshold value. The second variable resistor (VR2) is coupled to the hysteresis buffer 222 for setting the second threshold value. The potentiometer 223 receives the maximum power point, and controls resistances of the first and second variable resistors (VR1, VR2) with reference to the maximum power point. In this embodiment, the hysteresis buffer is a Schmitt trigger.

In particular, the potentiometer 223 is controlled by the control module 34 of the microcontroller 3. The control module 34 obtains the voltage at which the maximum power point is reached (i.e., 5V in FIG. 3), and controls the resistances of the first and second variable resistors (VR1, VR2) with reference to that voltage. In this embodiment, the divided voltage generated by the voltage divider 221 is set to fluctuate between ±10% of the voltage at the maximum power point (i.e., the divided voltage ranges between 4.5V and 5.5V).

Figure 5:
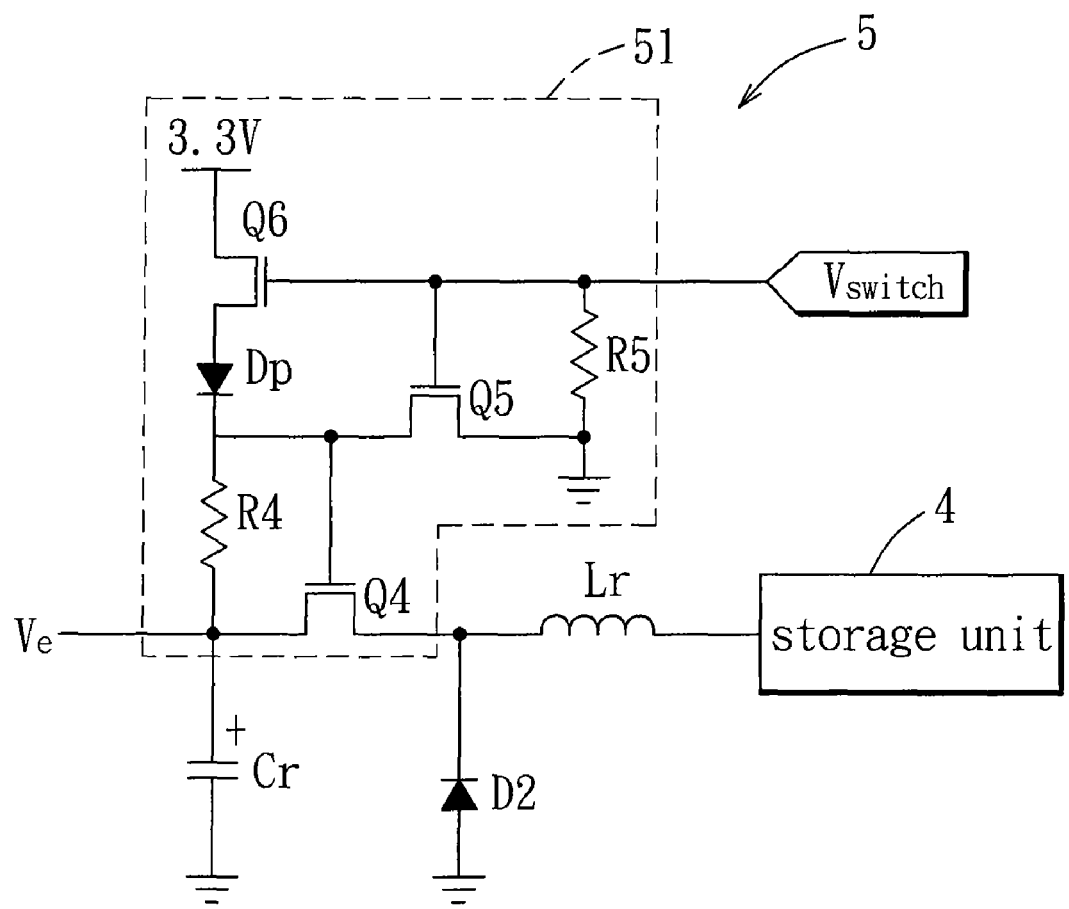
FIG. 5 is a schematic circuit diagram of a pulse frequency modulation regulator according to the preferred embodiment.

With reference to FIG. 5, the pulse frequency modulation regulator 5 includes a regulating capacitor (Cr), an isolating inductor (Lr), a second switch circuit 51, and a second diode (D2). The regulating capacitor (Cr) has a first terminal coupled to the first diode (D1) of the current tracing module 21 for receiving the electrical power signal ($V_e$) therefrom, and a grounded second terminal. The isolating inductor (Lr) has a first terminal that is coupled to the storage unit 4 and a second terminal. The second switch circuit 41 is coupled between the first terminal of the regulating capacitor (Cr) and the second terminal of the isolating inductor (Lr), and is operable to establish a connection between the first terminal of the regulating capacitor (Cr) and the second terminal of the isolating inductor (Lr) according to the switch control voltage signal ($V_{switch}$). The second diode (D2) is coupled between the second terminal of the isolating inductor (Lr) and ground for preventing adverse current from flowing back into the energy harvesting unit 1 and causing possible damage to the energy harvesting unit 1.

The regulating capacitor (Cr) is charged by the electrical power signal ($V_e$) when the second switch circuit 51 breaks the connection between the first terminal of the regulating capacitor (Cr) and the second terminal of the isolating inductor (Lr) according to the switch control voltage signal ($V_{switch}$). The isolating inductor (Lr) and the regulating capacitor (Cr) cooperate to convert the electrical power signal ($V_e$) into the intermediate signal when the second switch circuit 51 establishes the connection between the first terminal of the regulating capacitor (Cr) and the second terminal of the isolating inductor (Lr).

In this embodiment, the second switch circuit 42 includes a fourth switch member (Q4), a fifth switch member (Q5), a sixth switch member (Q6), a pull-up diode (Dp), a fourth resistor (R4), and a fifth resistor (R5).

The fourth switch member (Q4) has a first terminal that is coupled to the first terminal of the regulating capacitor (Cr), a second terminal that is coupled to the second terminal of the isolating inductor (Lr), and a control terminal. The fifth switch member (Q5) has a first terminal that is coupled to the control terminal of the fourth switch member (Q4), a grounded second terminal, and a control terminal that is coupled to the boundary control module 22 of the power point tracking unit 2 for receiving the switch control voltage signal ($V_{switch}$) therefrom. The sixth switch member (Q6) has a first terminal that is adapted for receiving a supply voltage (e.g., 3.3V), a second terminal, and a control terminal that is coupled to the control terminal of the fifth switch member (Q5). The pull-up diode (Dp) has an anode that is coupled to the second terminal of the sixth switch member (Q6), and a cathode that is coupled to the control terminal of the fourth switch member (Q4). The fourth resistor (R4) is coupled between the first terminal of the fourth switch member (Q4) and the control terminal of the fourth switch member (Q4). The fifth resistor (R5) is coupled between the second terminal of the fifth switch member (Q5) and the control terminal of the fifth switch member (Q5).

In this embodiment, each of the fourth switch member (Q4) and the sixth switch member (Q6) is a P-type transistor (PMOS), and the fifth switch member (Q5) is a N-type transistor (NMOS). Each of the fifth and sixth switch members (Q5, Q6) is controlled by the switch control voltage signal ($V_{switch}$) to turn on/off. When the fifth switch member (Q5) is turned on and the sixth switch member (Q6) is turned off, the control terminal of the fourth switch member (Q4) is grounded, and thus the fourth switch member (Q4) is turned off. At this time, the second switching circuit 51 breaks the connection between the first terminal of the regulating capacitor (Cr) and the second terminal of the isolating inductor (Lr). On the other hand, when the fifth switch member (Q5) is turned off and the sixth switch member (Q6) is turned on, the control terminal of the fourth switch member (Q4) is pulled up to the 3.3V supply voltage by the pull-up diode (Dp), such that the fourth switch member (Q4) is turned on. At this time, the second switch circuit 51 establishes the connection between the first terminal of the regulating capacitor (Cr) and the second terminal of the isolating inductor (Lr), and the energy of the electrical power signal ($V_e$) is stored in the storage unit 4.

Figure 6:
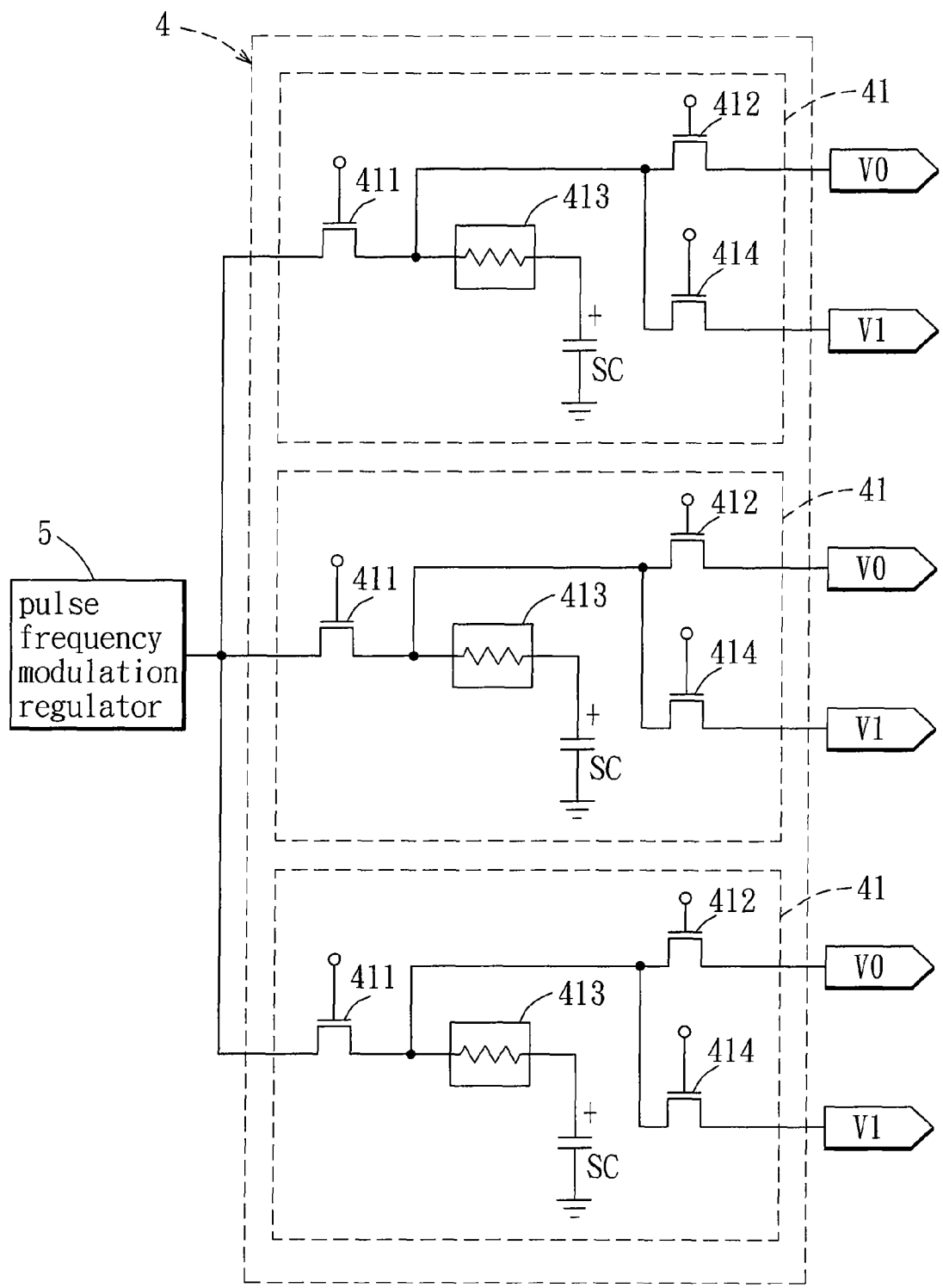
FIG. 6 is a schematic circuit block diagram of a storage unit according to the preferred embodiment.
Figure 7:
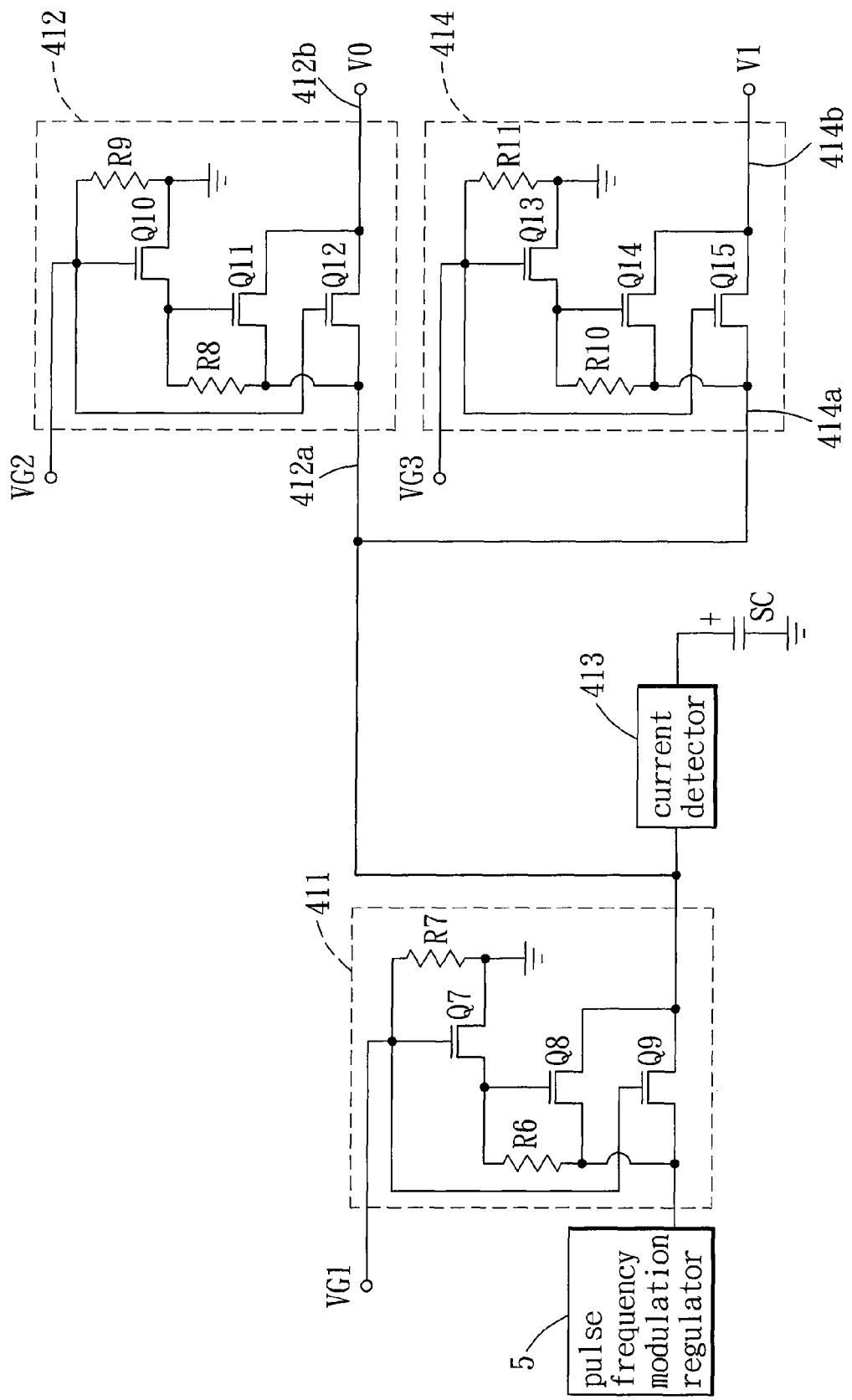
FIG. 7 is a schematic circuit diagram of a storage module of the storage unit according to the preferred embodiment.

With reference to FIG. 6 and FIG. 7, the storage unit 4 includes three storage modules 41, each of which includes an energy storage member (SC), a first power switch circuit 411, and a second power switch circuit 412.

The energy storage member (SC) has a grounded first terminal, and a second terminal. In this embodiment, the energy storage member (SC) is a supercapacitor. The first power switch circuit 411 is coupled between the pulse frequency modulation regulator 5 and the second terminal of the energy storage member (SC), and is operable between on and off states. Transmission of the intermediate signal from the pulse frequency modulation regulator 5 to the energy storage member (SC) is permitted when the first power switch circuit 411 operates in the on state. The second power switch circuit 412 has a first terminal 412a that is coupled to the second terminal of the energy storage member (SC), and a second terminal 412b, and is operable between on and off states. The energy storage member (SC) stores energy of the intermediate signal when the first power switch circuit 411 operates in the on state and when the second power switch circuit 412 operates in the off state, and releases energy stored therein when the first power switch circuit 411 operates in the off state and when the second power switch circuit 412 operates in the on state.

The storage unit 4 further includes a current detector 413 that is coupled between the first power switch circuit 411 and the second terminal of the energy storage member (SC) for detecting current flowing into and out of the energy storage member (SC). In addition, with reference to FIG. 1, the energy harvesting system 100 further includes a voltage regulating unit 7 that is coupled to the second terminal of the second power switch circuit 412 for receiving the energy released by the energy storage member (SC) when the second power switch circuit 412 operates in the on state, and that converts the energy released by the energy storage member (SC) into an output signal ($V_o$), which may be used as a power source for external devices.

Figure 8:
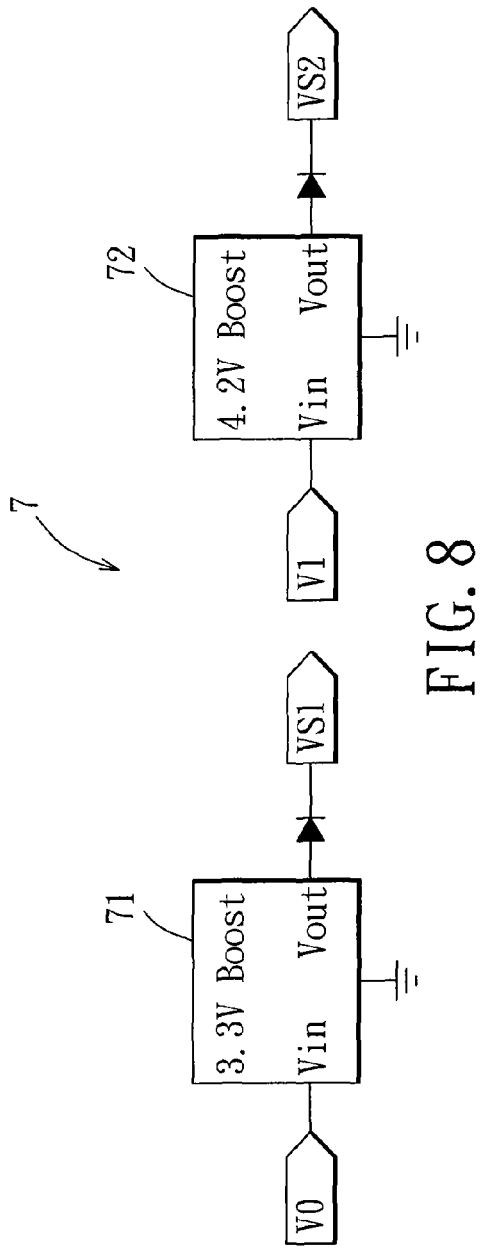
FIG. 8 is a schematic circuit block diagram of a voltage regulating unit according to the preferred embodiment.

In this embodiment, the storage unit 4 further includes a third power switch circuit 414 having a first terminal 414a that is coupled to the second terminal of the energy storage member (SC), and a second terminal 414b that is coupled to the voltage regulating unit 7. The energy storage member (SC) stores energy of the intermediate signal when the first power switch circuit 411 operates in the on state and when the second and third power switch circuits 412, 414 operate in the off state, and releases energy stored therein when the first power switch circuit 411 operates in the off state and when one of the second and third power switch circuits 412, 414 operates in the on state. Accordingly, with reference to FIG. 8, the voltage regulating unit 7 includes first and second voltage regulators 71, 72 that are respectively coupled to the second terminals 412b, 414b of the second and third power switch circuits 412, 414 of the storage unit 4, and that respectively convert the energy released by the energy storage member (SC) into first and second output signals (VS1, VS2). In other words, the present invention provides two power sources of different voltages for subsequent use by other devices.

With reference to FIG. 7, the first power switch circuit 411 includes a seventh switch member (Q7), an eighth switch member (Q8), a ninth switch member (Q9), a sixth resistor (R6), and a seventh resistor (R7). The seventh switch member (Q7) has a first terminal and a grounded second terminal, and is operable between on and off states according to control from the microcontroller 3. The eighth switch member (Q8) has a first terminal that is coupled to the pulse frequency modulation regulator 5, a second terminal, and a control terminal that is coupled to the first terminal of the seventh switch member (Q7). The ninth switch member (Q9) has a first terminal that is coupled to the first terminal of the eighth switch member (Q8), and a second terminal that is coupled to the second terminal of the eighth switch member (Q8), and is operable between on and off states according to control from the microcontroller 3. The sixth resistor (R6) is coupled between the first terminal of the eighth switch member (Q8) and the control terminal of the eighth switch member (Q8). The seventh resistor (R7) is coupled between the control terminal of the seventh switch member (Q7) and the second terminal of the seventh switch member (Q7).

In this embodiment, each of the seventh and ninth switch members (Q7, Q9) is a N-type transistor (NMOS), and the eighth switch member (Q8) is a P-type transistor (PMOS). Each of the seventh and ninth switch members (Q7, Q9) further has a control terminal that is coupled to the control module 34 of the microcontroller 3 for receiving a corresponding first control signal (VG1) therefrom, such that the corresponding one of the seventh and ninth switch members (Q7, Q9) is operable between on and off states according to the first control signal (VG1). When the seventh and ninth switch members (Q7, Q9) are controlled by the corresponding first control signal (VG1) to operate in the on state, the control terminal of the eighth switch member (Q8) is grounded, and thus the eighth switch member (Q8) is turned on. At this time, the first power switch circuit 411 operates in the on state. On the other hand, when the seventh and ninth switch members (Q7, Q9) are controlled by the corresponding first control signal (VG1) to operate in the off state, the eighth switch member (Q8) is turned of, such that the first power switch circuit 411 operates in the off state.

The second power switch circuit 412 includes a tenth switch member (Q10), an eleventh switch member (Q11), a twelfth switch member (Q12), an eighth resistor (R8) and a ninth resistor (R9). The tenth switch member (Q10) has a first terminal, and a grounded second terminal, and is operable between on and off states according to control from the microcontroller 3. The eleventh switch member (Q11) has a first terminal that is coupled to the first power switch circuit 411, a second terminal that is coupled to the voltage regulating unit 7, and a control terminal that is coupled to the first terminal of the tenth switch member (Q10). The twelfth switch member (Q12) has a first terminal that is coupled to the first terminal of the eleventh switch member (Q11), and a second terminal that is coupled to the second terminal of the eleventh switch member (Q11), and is operable between on and off states according to control from the microcontroller 3. The eighth resistor (R8) is coupled between the first terminal of the eleventh switch member (Q11) and the control terminal of the eleventh switch member (Q11). The ninth resistor (R9) is coupled between the control terminal of the tenth switch member (Q10) and the second terminal of the tenth switch member (Q10).

In this embodiment, each of the tenth and twelfth switch members (Q10, Q12) is a N-type transistor (NMOS), and the eleventh switch member (Q11) is a P-type transistor (PMOS). Each of the tenth and twelfth switch members (Q10, Q12) further has a control terminal that is coupled to the control module 34 of the microcontroller 3 for receiving a corresponding second control signal (VG2) therefrom, such that the corresponding one of the tenth and twelfth switch members (Q10, Q12) is operable between on and off states according to the corresponding second control signal (VG2). When the tenth and twelfth switch members (Q10, Q12) are controlled by the second control signal (VG2) to operate in the on state, the control terminal of the eleventh switch member (Q11) is grounded, and thus the eleventh switch member (Q11) is turned on. At this time, the second power switch circuit 412 operates in the on state. On the other hand, when the tenth and twelfth switch members (Q10, Q12) are controlled by the second control signal (VG2) to operate in the off state, the eleventh switch member (Q11) is turned off, such that the second power switch circuit 412 operates in the off state.

The third power switch circuit 414 includes a thirteenth switch member (Q13), a fourteenth switch member (Q14), a fifteenth switch member (Q15), a tenth resistor (R10) and an eleventh resistor (R11). The thirteenth switch member (Q13) has a first terminal, and a grounded second terminal, and is operable between on and off states according to control from the microcontroller 3. The fourteenth switch member (Q14) has a first terminal that is coupled to the second terminal of the energy storage member (SC), a second terminal, and a control terminal that is coupled to the first terminal of the thirteenth switch member (Q13). The fifteenth switch member (Q15) has a first terminal that is coupled to the second terminal of the energy storage member (SC), and a second terminal that is coupled to the second terminal of the fourteenth switch member (Q14), and is operable between on and off states according to control from the microcontroller 3. The tenth resistor (R10) is coupled between the first terminal of the fourteenth switch member (Q14) and the control terminal of the fourteenth switch member (Q14). The eleventh resistor (R11) is coupled between the control terminal of the thirteenth switch member (Q13) and the second terminal of the thirteenth switch member (Q13).

In this embodiment, each of the thirteenth and fifteenth switch members (Q13, Q15) is a N-type transistor (NMOS), and the fourteenth switch member (Q14) is a P-type transistor (PMOS). Each of the thirteenth and fifteenth switch members (Q13, Q15) further has a control terminal that is coupled to the control module 34 of the microcontroller 3 for receiving a corresponding third control signal (VG3) therefrom, such that the corresponding one of the thirteenth and fifteenth switch members (Q13, Q15) is operable between on and off states according to the corresponding third control signal (VG3). When the thirteenth and fifteenth switch members (Q13, Q15) are controlled by the third control signal (VG3) to operate in the on state, the control terminal of the fourteenth switch member (Q14) is grounded, and thus the fourteenth switch member (Q14) is turned on. At this time, the third power switch circuit 414 operates in the on state. On the other hand, when the thirteenth and fifteenth switch members (Q13, Q15) are controlled by the corresponding third control signal (VG3) to operate in the off state, the fourteenth switch member (Q14) is turned off, such that the third power switch circuit 414 operates in the off state.

With reference back to FIG. 6, the storage modules 41 can be independently controlled such that the energy storage member (SC) of one of the storage modules 41 can be storing energy while the energy storage member (SC) of another one of the storage modules 41 is releasing energy. It should be noted herein that the number of storage modules 41 is not limited to three.

It can be seen from the above description that the energy harvesting system 100 of the present invention first operates in the tracing mode in order to determine the maximum power point corresponding to the energy harvesting unit 1, and enters the storing mode after the maximum power point has been determined.

It is noted that the voltage detecting module 31, the computing module 32 and the signal generator 33 do not serve any functions during the storing mode. In order to decrease power consumed by the microcontroller 3 (as shown in FIG. 1), the microcontroller 3 may be controlled to operate in one of a working mode, where the voltage detecting module 31, the computing module 32 and the signal generator 33 are active, and a sleep mode, where the voltage detecting module 31, the computing module 32 and the signal generator 33 are inactive. The voltage detecting module 31 and the current tracing module 21 respectively detect the voltage and the current of the electrical power signal ($V_e$) when the microcontroller 3 operates in the working mode.

Figure 9:
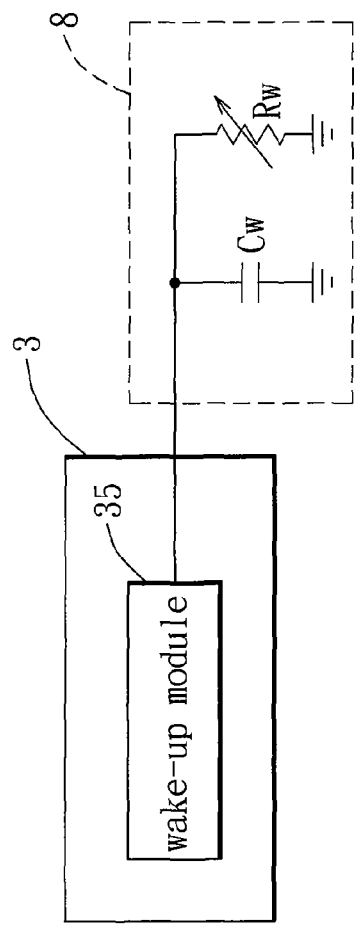
FIG. 9 is a schematic circuit diagram of a wake-up unit according to the preferred embodiment.

With reference to FIG. 1, the energy harvesting system 100 further includes a wake-up unit 8 coupled to the microcontroller 3 for controlling the microcontroller 3 to switch from operating in the sleep mode to operating in the working mode. Referring to FIG. 9, the wake-up unit 8 includes a wake-up capacitor (Cw) coupled between the microcontroller 3 and ground, and a wake-up resistor (Rw) coupled in parallel to the wake-up capacitor (Cw). In addition, the microcontroller 3 further includes a wake-up module 35 capable of detecting whether or not energy stored in the wake-up unit 8 is lower than a threshold value. The microcontroller 3 is controlled to switch to the working mode when the control module 34 is notified by the wake-up module 35 of energy stored in the wake-up unit 8 being lower than the threshold value.

It should be noted herein that when the microcontroller 3 operates in the sleep mode, the control module 34 and the wake-up module 35 remain functioning. Moreover, in this embodiment, the wake-up unit 8 has a time constant of 10 seconds. In other words, the microcontroller 3 remains in the sleep mode for 10 seconds prior to switching to the working mode. Since the maximum power point corresponding to the energy harvesting unit 1 changes due to variations in temperature and weather, once the microcontroller 3 is switched to the working mode, the power point tracking unit 2 will re-locate the maximum power point for the energy harvesting unit 1 so as to maintain operating efficiency of the energy harvesting system 100. While the energy of the electrical power signal ($V_e$) is stored in the storage unit 4 with the updated maximum power point, the microcontroller 3 goes into the sleep mode again in order to save power consumption.

It should be noted herein that when the microcontroller 3 operates in the working mode, the wake-up capacitor (Cw) will be fully charged, such that the time constant of the wake-up unit 8 is fixed each time the microcontroller 3 is switched to the sleep mode. Moreover, the wake-up resistor (Rw) may be a variable resistor that may be set to adjust the time constant of the wake-up unit 8 according to user's needs.

In summary, since the energy harvesting system 100 of the present invention utilizes the power point tracking unit 2 and the microcontroller 3 to locate the maximum power point corresponding to the energy harvesting unit 1 that is currently used by the energy harvesting system 100, the energy harvesting system 100 can be maintained to operate in an optimal efficiency regardless of the energy harvesting unit 1 that is in place. As such, the energy harvesting system 100 of the present invention is more flexible, can adopt different, or different types of energy harvesting units 1, and is capable of enhancing the energy harvesting efficiency of the energy harvesting unit 1 and decreasing the time it takes for storage of energy in the storage unit 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An energy harvesting system, comprising:
    an energy harvesting unit adapted for converting energy from a natural energy source into an electrical power signal;
    a power point tracking unit including a current tracing module that is coupled to said energy harvesting unit and that is capable of detecting a current of the electrical power signal, and a boundary control module;
    a microcontroller including a voltage detecting module that is coupled to said energy harvesting unit and that is capable of detecting a voltage of the electrical power signal, and a computing module that is coupled to said voltage detecting module and said current tracing module of said power point tracking unit, and that determines a maximum power point with reference to the voltage and the current of the electrical power signal as respectively detected by said voltage detecting module and said current tracing module, said boundary control module of said power point tracking unit receiving the maximum power point that is determined by said computing module, and generating a switch control voltage signal with reference to the maximum power point;
    a storage unit capable of storing energy; and
    a pulse frequency modulation regulator coupled to said energy harvesting unit and said power point tracking unit for respectively receiving the electrical power signal and the switch control voltage signal therefrom, and converting the electrical power signal into an intermediate signal with reference to the switch control voltage signal for subsequent storage of energy of the intermediate signal in said storage unit.

2. The energy harvesting system as claimed in claim 1, wherein said current tracing module includes
    a current detecting circuit having an input terminal and an output terminal, said input terming being coupled to said energy harvesting unit for receiving the electrical power signal therefrom, and
    a first switch member having a first terminal that is coupled to said output terminal of said current detecting circuit, and a grounded second terminal, said first switch member being an impedance-variable switch member that is operable between on and off states, and that is controllable to have at least two different equivalent impedances when operating in the on state, said voltage detecting module of said microcontroller being connected to said first switch member;
    wherein said current detecting circuit is capable of detecting a current flowing through said first switch member and corresponding to said at least two equivalent impedances, and said voltage detecting module of said microcontroller is capable of detecting a voltage across said first switch member and corresponding to said at least two equivalent impedances when said first switch member operates in the on state; and wherein said computing module determines the maximum power point with reference to the voltages and the currents detected respectively by said voltage detecting module and said current tracing module and corresponding respectively to said at least two different equivalent impedances of said first switch member.

3. The energy harvesting system as claimed in claim 2, wherein said current tracing module further includes a first switch circuit that is operable to establish connections between said output terminal of said current detecting circuit and said pulse frequency modulation regulator and between said output terminal of said current detecting circuit and said boundary control module of said power point tracking unit so as to permit transmission of the electrical power signal to said pulse frequency modulation regulator and said boundary control module;

said first switch member operating in the on state when said first switch circuit disconnects said current detecting circuit from said boundary control module and said pulse frequency modulation regulator;

said boundary control module of said power point tracking unit generating the switch control voltage signal with reference to the maximum power point and the electrical power signal when said first switch circuit connects said current tracing module thereto.

4. The energy harvesting system as claimed in claim 3, wherein said boundary control module of said power point tracking unit includes:

a voltage divider for receiving the electrical power signal when said first switch circuit establishes the connection between said output terminal of said current detecting circuit and said boundary control module, and generating a divided voltage;

a hysteresis buffer coupled to said voltage divider for receiving the divided voltage therefrom, and generating the switch control voltage signal with reference to the divided voltage according to a first threshold value and a second threshold value;

a first variable resistor coupled to said hysteresis buffer for setting the first threshold value;

a second variable resistor coupled to said hysteresis buffer for setting the second threshold value; and a potentiometer for receiving the maximum power point, and controlling resistances of said first and second variable resistors with reference to the maximum power point.

5. The energy harvesting system as claimed in claim 4, wherein said first switch circuit includes a second switch member and a third switch member, each of said second and third switch members having a first terminal, a second terminal and a control terminal, said first terminal of said second switch member being coupled to said output terminal of said current detecting circuit, said second terminal of said second switch being coupled to said pulse frequency modulation regulator and said boundary control module of said power point tracking unit, said control terminal of said second switch member being coupled to said first terminal of said third switch member, said second terminal of said third switch member being grounded, said control terminal of said third switch member being coupled to said microcontroller.

6. The energy harvesting system as claimed in claim 1, wherein said pulse frequency modulation regulator includes a regulating capacitor having a first terminal for receiving the electrical power signal, and a grounded second terminal, an isolating inductor having a first terminal that is coupled to said storage unit, and a second terminal, and a second switch circuit coupled between said first terminal of said regulating capacitor and said second terminal of said isolating inductor, and operable to establish a connection between said first terminal of said regulating capacitor and said second terminal of said isolating inductor according to the switch control voltage signal; and wherein said regulating capacitor is charged by the electrical power signal when said second switch circuit breaks the connection between said first terminal of said regulating capacitor and said second terminal of said isolating inductor according to the switch control voltage signal, said isolating inductor and said regulating capacitor cooperating to convert the electrical power signal into the intermediate signal when said second switch circuit establishes the connection between said first terminal of said regulating capacitor and said second terminal of said isolating inductor.

7. The energy harvesting system as claimed in claim 6, wherein said second switch circuit includes:

a fourth switch member having a first terminal that is coupled to said first terminal of said regulating capacitor, a second terminal that is coupled to said second terminal of said isolating inductor, and a control terminal;

a fifth switch member having a first terminal that is coupled to said control terminal of said fourth switch member, a grounded second terminal, and a control terminal that is coupled to said boundary control module of said power point tracking unit for receiving the switch control voltage signal therefrom;

a sixth switch member having a first terminal that is adapted for receiving a supply voltage, a second terminal, and a control terminal that is coupled to said control terminal of said fifth switch member; and a pull-up diode having an anode that is coupled to said second terminal of said sixth switch member, and a cathode that is coupled to said control terminal of said fourth switch member.

8. The energy harvesting system as claimed in claim 1, wherein said storage unit includes an energy storage member having a grounded first terminal, and a second terminal, a first power switch circuit coupled between said pulse frequency modulation regulator and said second terminal of said energy storage member, and operable between on and off states, transmission of the intermediate signal from said pulse frequency modulation regulator to said energy storage member being permitted when said first power switch circuit operates in the on state, and a second power switch circuit having a first terminal that is coupled to said second terminal of said energy storage member, and a second terminal, and being operable between on and off states; and wherein said energy storage member stores energy of the intermediate signal when said first power switch circuit operates in the on state and when said second power switch circuit operates in the off state, and releases energy stored therein when said first power switch circuit operates in the off state and when said second power switch circuit operates in the on state.

9. The energy harvesting system as claimed in claim 8, wherein said storage unit further includes a current detector that is coupled between said first power switch circuit and said second terminal of said energy storage member for detecting current flowing into and out of said energy storage member.

10. The energy harvesting system as claimed in claim 8, further comprising a voltage regulating unit that is coupled to said second terminal of said second power switch circuit for receiving the energy released by said energy storage member when said second power switch circuit operates in the on state, and that converts the energy released by said energy storage member into an output signal.

11. The energy harvesting system as claimed in claim 10, wherein said first power switch circuit includes
   a seventh switch member having a first terminal, and a grounded second terminal, and being operable between on and off states according to control from said microcontroller,
   an eighth switch member having a first terminal that is coupled to said pulse frequency modulation regulator, a second terminal, and a control terminal that is coupled to said first terminal of said seventh switch member, and
   a ninth switch member having a first terminal that is coupled to said first terminal of said eighth switch member, and a second terminal that is coupled to said second terminal of said eighth switch member, and being operable between on and off states according to control from said microcontroller;
   wherein said first power switch circuit operates in the on state when said seventh and ninth switch members are controlled by said microcontroller to operate in the on state.

12. The energy harvesting system as claimed in claim 10, wherein said second power switch circuit includes:
   a tenth switch member having a first terminal, and a grounded second terminal, and being operable between on and off states according to control from said microcontroller;
   an eleventh switch member having a first terminal that is coupled to said first power switch circuit, a second terminal that is coupled to said voltage regulating unit, and a control terminal that is coupled to said first terminal of said tenth switch member; and
   a twelfth switch member having a first terminal that is coupled to said first terminal of said eleventh switch member, and a second terminal that is coupled to said second terminal of said eleventh switch member, and being operable between on and off states according to control from said microcontroller; and
   wherein said second power switch circuit operates in the on state when said tenth and twelfth switch members are controlled by said microcontroller to operate in the on state.

13. The energy harvesting system as claimed in claim 10, wherein said storage unit further includes a third power switch circuit having a first terminal that is coupled to said second terminal of said energy storage member, and a second terminal that is coupled to said voltage regulating unit;
   wherein said energy storage member stores energy of the intermediate signal when said first power switch circuit operates in the on state and when said second and third power switch circuits operate in the off state, and releases energy stored therein when said first power switch circuit operates in the off state and when one of said second and third power switch circuits operates in the on state.

14. The energy harvesting system as claimed in claim 13, wherein said third power switch circuit includes:
   a thirteenth switch member having a first terminal, and a grounded second terminal, and being operable between on and off states according to control from said microcontroller;
   a fourteenth switch member having a first terminal that is coupled to said second terminal of said energy storage member, a second terminal, and a control terminal that is coupled to said first terminal of said thirteenth switch member; and
   a fifteenth switch member having a first terminal that is coupled to said second terminal of said energy storage member, and a second terminal that is coupled to said second terminal of said fourteenth switch member, and being operable between on and off states according to control from said microcontroller;
   wherein said third power switch circuit operates in the on state when said thirteenth and fifteenth switch members are controlled by said microcontroller to operate in the on state.

15. The energy harvesting system as claimed in claim 13, wherein said voltage regulating unit includes first and second voltage regulators that are respectively coupled to said second terminals of said second and third power switch circuits of said storage unit, and that respectively convert the energy released by said energy storage member into first and second output signals.

16. The energy harvesting system as claimed in claim 1, wherein said microcontroller is operable in one of a working mode and a sleep mode, said microcontroller further including a control module for controlling said current tracing module of said power point tracking unit to detect the current of the electrical power signal, said voltage detecting module and said current tracing module respectively detecting the voltage and current of the electrical power signal when said microcontroller operates in the working mode, said energy harvesting system further comprising a wake-up unit that is coupled to said microcontroller for controlling said microcontroller to switch from operating in the sleep mode to operating in the working mode.

17. The energy harvesting system as claimed in claim 16, wherein said wake-up unit includes a wake-up capacitor coupled between said microcontroller and ground, and a wake-up resistor coupled in parallel to said wake-up capacitor, said microcontroller being controlled to switch to the working mode when energy stored in said wake-up unit is lower than a threshold value.

18. The energy harvesting system as claimed in claim 1, wherein said energy harvesting unit includes at least one solar panel that is capable of converting light energy into the electrical power signal.

\* \* \* \* \*